United States Patent
Sharifi

(10) Patent No.: US 12,485,600 B2
(45) Date of Patent: Dec. 2, 2025

(54) METHOD FOR PRODUCING AN EXTRUDED SULPHURVULCANIZABLE RUBBER BLEND, DEVICE FOR CARRYING OUT THE METHOD AND USE THEREOF

(71) Applicant: Continental Reifen Deutschland GmbH, Hannover (DE)

(72) Inventor: Monir Sharifi, Ronnenberg (DE)

(73) Assignee: Continental Reifen Deutschland GmbH, Hannover (DE)

( * ) Notice: Subject to any disclaimer, the term of this patent is extended or adjusted under 35 U.S.C. 154(b) by 505 days.

(21) Appl. No.: 17/595,600

(22) PCT Filed: Mar. 30, 2020

(86) PCT No.: PCT/EP2020/059006
§ 371 (c)(1),
(2) Date: Nov. 19, 2021

(87) PCT Pub. No.: WO2020/239293
PCT Pub. Date: Dec. 3, 2020

(65) Prior Publication Data
US 2022/0227034 A1    Jul. 21, 2022

(30) Foreign Application Priority Data
May 27, 2019 (DE) .................. 10 2019 207 732.3

(51) Int. Cl.
| | | |
|---|---|---|
| B29C 48/92 | (2019.01) | |
| B29B 7/58 | (2006.01) | |
| B29C 48/00 | (2019.01) | |
| B29C 48/07 | (2019.01) | |
| B29C 48/285 | (2019.01) | |
| B29C 48/793 | (2019.01) | |
| B29K 21/00 | (2006.01) | |
| B29K 105/24 | (2006.01) | |

(52) U.S. Cl.
CPC ............ B29C 48/92 (2019.02); B29C 48/022 (2019.02); B29C 48/07 (2019.02); B29C 48/2888 (2019.02); B29C 48/793 (2019.02); B29B 7/58 (2013.01); B29C 2948/92704 (2019.02); B29C 2948/92828 (2019.02); B29C 2948/92876 (2019.02); B29C 2948/92933 (2019.02); B29C 2948/92961 (2019.02); B29K 2021/006 (2013.01); B29K 2105/246 (2013.01)

(58) Field of Classification Search
None
See application file for complete search history.

(56) References Cited

U.S. PATENT DOCUMENTS

| | | | |
|---|---|---|---|
| 4,680,152 A | 7/1987 | Capelle | |
| 5,156,781 A | 10/1992 | Bohm et al. | |
| 5,259,670 A | 11/1993 | Brown | |
| 6,111,021 A * | 8/2000 | Nakahama | ............... C08L 91/00 525/197 |
| 6,294,119 B1 * | 9/2001 | Nakamura | ............... B29C 48/07 264/173.17 |
| 6,433,065 B1 | 8/2002 | Lin et al. | |
| 6,581,660 B2 * | 6/2003 | Meza | ........................ C08K 5/41 152/209.5 |
| 7,249,621 B2 * | 7/2007 | Sandstrom | ............... C08L 21/00 152/209.7 |
| 7,655,728 B2 * | 2/2010 | Nadella | .................... B29B 7/489 525/203 |
| 8,003,724 B2 * | 8/2011 | Hahn | .................... C09C 1/3081 556/463 |
| 8,314,185 B2 * | 11/2012 | Herzog | .................. B65G 15/32 525/106 |

(Continued)

FOREIGN PATENT DOCUMENTS

| | | | | |
|---|---|---|---|---|
| AU | 2013257436 A1 * | 6/2014 | ........... C08K 5/3447 | |
| CA | 2225995 A1 * | 1/1997 | ............... C08K 5/09 | |

(Continued)

OTHER PUBLICATIONS

Barbosa et al., "Devulcanization of Natural Rubber in Composites with Distinct Crosslink Densities by Twin-Screw Extruder", Dec. 2016, Materials Research. 2017; 20(Suppl. 2): 77-83. (Year: 2016).*
Miliani et al., "A Three-Function Numerical Model for the Prediction of Vulcanization-Reversion of Rubber During Sulfur Curing", Oct. 2009, Journal of Applied Polymer Science, vol. 119, 419-437 (2011). (Year: 2009).*

(Continued)

*Primary Examiner* — Mohammad Ali
*Assistant Examiner* — Kelvin Booker
(74) *Attorney, Agent, or Firm* — Richard A. Wolf; Gregory Adams

(57) ABSTRACT

The invention relates to a process for producing an extruded sulfur-crosslinkable rubber mixture, comprising the following process steps:

A) producing a sulfur-crosslinkable rubber mixture by means of a mixer or providing a sulfur-crosslinkable rubber mixture, where the temperature of the sulfur-crosslinkable rubber mixture is less than 35° C., B) contactlessly adjusting the temperature of the sulfur-crosslinkable rubber mixture produced or provided in step A) to at least 40° C. in a temperature adjustment unit, C) measuring the temperature of the rubber mixture in the temperature adjustment unit and D) feeding the sulfur-crosslinkable rubber mixture that has been measured in step C) into an extrusion unit at a temperature of 35° C. or more and extruding the fed rubber mixture in the extrusion unit. The invention further relates to an apparatus for performing the process and to the use of the apparatus.

15 Claims, No Drawings

(56) References Cited

U.S. PATENT DOCUMENTS

| | | | | |
|---|---|---|---|---|
| 8,450,424 | B2* | 5/2013 | Koelle | C08L 19/006 |
| | | | | 525/194 |
| 8,481,633 | B2* | 7/2013 | Schmidt | B29B 7/7495 |
| | | | | 524/492 |
| 8,846,816 | B2* | 9/2014 | Borkowsky | 524/403 |
| 9,388,290 | B2* | 7/2016 | Schroeder et al. | 524/403 |
| 9,856,368 | B2* | 1/2018 | Herzog | C08L 9/06 |
| 2002/0180085 | A1* | 12/2002 | Rothemeyer | B29C 48/53 |
| | | | | 264/68 |
| 2003/0136498 | A1* | 7/2003 | Calvar | B29C 48/397 |
| | | | | 156/128.6 |
| 2005/0080150 | A1* | 4/2005 | Nakahama | C08F 8/34 |
| | | | | 521/50 |
| 2006/0293457 | A1* | 12/2006 | Nadella | B29C 48/54 |
| | | | | 525/192 |
| 2010/0282387 | A1* | 11/2010 | Wenzel | B60C 11/00 |
| | | | | 152/209.15 |
| 2011/0071245 | A1* | 3/2011 | De-Riva Perez | B29D 29/00 |
| | | | | 524/432 |
| 2011/0112213 | A1* | 5/2011 | Recker | B60C 1/00 |
| | | | | 523/156 |
| 2012/0223463 | A1* | 9/2012 | Kovac | B29D 30/0601 |
| | | | | 264/501 |
| 2012/0296049 | A1* | 11/2012 | Yonemaru | C08L 71/03 |
| | | | | 525/410 |
| 2013/0023595 | A1* | 1/2013 | Martel | C08L 21/00 |
| | | | | 366/144 |
| 2013/0102714 | A1* | 4/2013 | Recker | C08L 21/00 |
| | | | | 524/262 |
| 2013/0109799 | A1* | 5/2013 | Weber | C08K 5/01 |
| | | | | 524/508 |
| 2013/0109800 | A1* | 5/2013 | Weber | C08L 9/00 |
| | | | | 524/508 |
| 2013/0225766 | A1* | 8/2013 | Theusner | B02C 23/08 |
| | | | | 209/164 |
| 2013/0289183 | A1* | 10/2013 | Kerns | C08F 236/10 |
| | | | | 524/313 |
| 2013/0289197 | A1* | 10/2013 | Pavon Sierra | B60C 1/0016 |
| | | | | 524/526 |
| 2014/0171556 | A1* | 6/2014 | Kramer | C08L 7/00 |
| | | | | 524/81 |
| 2014/0171564 | A1* | 6/2014 | Torbruegge | C08K 3/04 |
| | | | | 524/184 |
| 2015/0031820 | A1* | 1/2015 | Stollberg | C08L 9/06 |
| | | | | 524/502 |
| 2015/0166759 | A1* | 6/2015 | Recker | C08J 11/10 |
| | | | | 521/41.5 |
| 2015/0174961 | A1* | 6/2015 | Kramer | D02G 3/045 |
| | | | | 525/425 |
| 2016/0108211 | A1* | 4/2016 | Busch | B29B 7/7495 |
| | | | | 524/526 |
| 2016/0108212 | A1* | 4/2016 | Busch | C08L 91/06 |
| | | | | 524/526 |
| 2016/0160014 | A1* | 6/2016 | Schwekendiek | B60C 1/0016 |
| | | | | 523/156 |
| 2016/0194485 | A1* | 7/2016 | Herzog | B60C 13/00 |
| | | | | 152/450 |
| 2016/0200141 | A1* | 7/2016 | Herzog | C08K 3/04 |
| | | | | 523/156 |
| 2016/0222197 | A1* | 8/2016 | Peters | C08L 9/00 |
| 2016/0229992 | A1* | 8/2016 | Peters | C08L 7/00 |
| 2016/0297948 | A1* | 10/2016 | Herzog | C08K 3/36 |
| 2017/0001294 | A1 | 1/2017 | Koizmui et al. | |
| 2017/0073508 | A1* | 3/2017 | Schwekendiek | C08L 91/06 |
| 2017/0348877 | A1* | 12/2017 | Wenzel | B29C 33/3892 |
| 2018/0066094 | A1* | 3/2018 | Herzog | C08F 212/14 |
| 2018/0100057 | A1* | 4/2018 | Peters | C08K 3/04 |
| 2018/0100058 | A1* | 4/2018 | Pavon Sierra | C08L 23/26 |
| 2018/0223081 | A1* | 8/2018 | Schwarzendahl | C08L 7/00 |
| 2018/0290337 | A1* | 10/2018 | Steiner | B29B 7/82 |
| 2019/0023881 | A1* | 1/2019 | Rajan | C08L 9/00 |

FOREIGN PATENT DOCUMENTS

| | | | | | |
|---|---|---|---|---|---|
| CN | 1189845 | A | * | 8/1998 | C08J 3/00 |
| CN | 1618843 | A | * | 2/2005 | B29B 7/7495 |
| CN | 103073741 | A | * | 5/2013 | B29B 7/7495 |
| CN | 102083893 | B | * | 7/2014 | B29C 47/10 |
| CN | 117186556 | A | * | 12/2023 | B29C 48/92 |
| DE | 29923755 | U1 | * | 4/2001 | B29C 48/832 |
| DE | 69728538 | T2 | | 3/2005 | |
| DE | 102007025508 | A1 | * | 12/2008 | B29C 48/154 |
| DE | 102017205673 | A1 | * | 10/2018 | B29C 64/106 |
| DE | 102018202610 | A1 | * | 8/2019 | B29C 48/2888 |
| EP | 0837098 | A1 | * | 4/1998 | C08L 23/02 |
| EP | 0911359 | A1 | | 4/1999 | |
| EP | 1621578 | A1 | * | 2/2006 | C08L 21/00 |
| EP | 1759889 | A2 | * | 3/2007 | B29C 48/49 |
| EP | 2853557 | A1 | * | 4/2015 | B29B 7/7495 |
| EP | 2853558 | A1 | * | 4/2015 | B29B 7/7495 |
| EP | 3100828 | A1 | | 12/2016 | |
| EP | 3100838 | A1 | | 12/2016 | |
| EP | 3431251 | A1 | * | 1/2019 | B29C 48/92 |
| EP | 3744500 | A1 | * | 12/2020 | B29B 7/58 |
| JP | S5192564 | U | | 8/1976 | |
| JP | H0315505 | A | | 1/1991 | |
| JP | H1157445 | A | | 3/1999 | |
| JP | 2001525739 | A | | 12/2001 | |
| JP | 2004091746 | A | | 3/2004 | |
| JP | 2004511600 | A | | 4/2004 | |
| JP | 2017077713 | A | | 4/2017 | |
| JP | 2018028018 | A | | 2/2018 | |
| WO | WO-9702316 | A1 | * | 1/1997 | C08J 3/00 |
| WO | 9850210 | A1 | | 11/1998 | |
| WO | 0110627 | A1 | | 2/2001 | |
| WO | WO-2018033313 | A1 | * | 2/2018 | B29B 7/7495 |
| WO | WO-2018033314 | A1 | * | 2/2018 | B29B 7/7495 |
| WO | WO-2018033315 | A1 | * | 2/2018 | B29B 7/7495 |
| WO | WO-2018033505 | A1 | * | 2/2018 | B29B 7/7495 |
| WO | WO-2018033506 | A1 | * | 2/2018 | B29B 7/7495 |
| WO | WO-2018033508 | A1 | * | 2/2018 | B29B 7/7495 |

OTHER PUBLICATIONS

Miliania, et al., "Optimization of extrusion production lines for EPDM rubber vulcanized with sulphur: A two-phase model based on Finite Elements and kinetic second order differential equation", Feb. 2011, Computers and Chemical Engineering 43 (2012) 173-190. (Year: 2011).*

Saikia, A. "Modelling the Vulcanization Reaction of Devulcanized Rubber", 2014, University of Waterloo in fulfillment of the thesis requirement for the degree of Master of Applied Science. (Year: 2014).*

Coran, A., "Vulcanization: Conventional and Dynamic", Mar. 1995, Charles Goodyear Medal presented May 3, 1995. (Year: 1995).*

Heideman et al., "Activators in Accelerated Sulfur Vulcanization", Jan. 2004 (Year: 2004).*

Office Action dated Feb. 15, 2023 from corresponding Russian patent application No. 2021138367.

Infrarot-Vortrocknung von PET Flakes: Leistungssteigerung und Qualitätsverbesserung bei Entgasungsextrudern—https://kreyenborg.com/, Pressemitteilung der Firmenhompage.

International Search Report dated Jul. 13, 2020 of International Application PCT/EP2020/059006 on which this application is based.

Shvarc O. et al. / Pererabotka Plastmass (Plastic Recycling) 2008, p. 83-84, p. 21, par. 2—p. 24, par. 1 (2022Q04652).

Shashok Zh.S. et. al. / Tekhnologiya pererabotki elastomerov. Uchebno-metodicheskoe posobie dlya studentov specialnosti (Elastomer processing technology. Teaching aid for students of the specialty)—2012 (2022Q04651).

Search Report dated Jun. 30, 2022 of counterpart Russian Application No. 2021138367.

Chinese Office Action dated Feb. 11, 2023 from corresponding Chinese Patent Application No. 202080038647.7.

Chinese Office Action dated Jul. 20, 2023 from corresponding Chinese Patent Application No. 202080038647.7.

Brazil Office Action dated Mar. 30, 2020 from corresponding Brazil Publication No. BR112021022565-0.

(56) References Cited

OTHER PUBLICATIONS

JP Office Action dated Jul. 21, 2022 of JP counterpart application 2021-567065.
European Examination Report dated Jul. 22, 2024 for the counterpart European Patent Application No. 20 715 865.0 and machine translation of same.
BR Office action dated Jul. 16, 2024 of counterpart WOBR application No. BR112021022565-0.
Brazilian Office Action dated Dec. 24, 2024 for the counterpart Brazilian Patent Application No. BR112021022565-0.

\* cited by examiner

METHOD FOR PRODUCING AN EXTRUDED SULPHURVULCANIZABLE RUBBER BLEND, DEVICE FOR CARRYING OUT THE METHOD AND USE THEREOF

The invention relates to a process for producing an extruded sulfur-crosslinkable rubber mixture. The invention further relates to an apparatus for performing the process and to the use of the apparatus.

On account of current developments in the rubber industry—especially in tire manufacture—toward full automation of production processes, the quality demands on the respective rubber product are rising constantly. Of particular importance are weight and geometric dimensions of the extruded rubber mixture, which is frequently in the form of a continuous strip, called a rubber profile. In the extrusion, a blended rubber mixture is extruded, for example, by means of the screws in a twin-screw extruder and then shaped to a rubber profile by means of a shaping unit, for example a preliminary and final template.

Variances from the geometric dimensions or excessive variations in the weight of the rubber profile frequently result in the need to discard a large portion of the rubber profile, and hence unnecessary environmental pollution or prolonging of the production process.

A primary problem addressed by the invention is therefore that of providing a process for producing an extruded sulfur-crosslinkable rubber mixture that does not have the known disadvantages described above and enables automated extrusion of a rubber mixture to a rubber profile.

A particular problem addressed was that of extruding rubber mixtures such that the predetermined weight or predetermined dimensions thereof can be set more accurately.

This object is achieved in accordance with the invention by a process for producing an extruded sulfur-crosslinkable rubber mixture, comprising the following process steps:
A) producing a sulfur-crosslinkable rubber mixture using a mixer or providing a sulfur-crosslinkable rubber mixture,
B) contactlessly adjusting the temperature of the sulfur-crosslinkable rubber mixture produced or provided in step A) to at least 40° C. in a temperature adjustment unit,
C) optionally measuring the temperature in the rubber mixture, the temperature of which has been adjusted in step B), preferably in the temperature adjustment unit, and
D) feeding the sulfur-crosslinkable rubber mixture, the temperature of which has been adjusted in step B) and measured in step C), into an extrusion unit at a temperature of 35° C. or more and extruding the fed rubber mixture in the extrusion unit.

It is a great achievement of the present invention to have found that an increase in the temperature of a rubber mixture prior to extrusion in an extrusion unit can especially reduce variations in weight per meter of the rubber profile produced by means of the extrusion unit. It is possible here for the variances from the envisaged target value of the weight per meter to be halved by virtue of the heating to at least 40° C. upstream of the extrusion unit in step B) of a process of the invention. Such a halving of variances from the target value of the weight per meter results in an increase in productivity of at least 5% compared to noninventive processes without temperature adjustment as in step B), and hence in a considerable reduction in the burden on the environment. A temperature adjustment unit designed to heat a sulfur-crosslinkable rubber mixture present in the temperature adjustment unit to at least 60° C. or even above 80° C. reduces said variances even further.

In addition, on account of the temperature adjustment in step B), it is possible to reduce not only the variances from the target value of the weight per meter but surprisingly also the pressures and variations in pressure of the rubber mixture that occur in the extrusion unit or the drive power of the extruder screw of the extrusion unit used for extrusion of the rubber mixture in the extrusion unit in a process of the invention as described above or as described above as preferred. The reduction in pressure leads to energy savings and small variations in temperature, and hence to more uniform geometric dimensions.

In addition, it is possible to reduce the variances in the geometric dimensions from the envisaged cross section of the rubber profile. For establishment of particular geometric dimensions, an extrusion unit customary in the rubber industry comprises a shaping component, for example a final template, that shapes the extruded rubber mixture into the desired geometric shape with the appropriate geometric dimensions. The resultant extruded and shaped rubber mixture is a rubber profile. In the context of the present invention, therefore, an extrusion unit comprises an above-described shaping component as standard, and so the process of the invention is especially a process for producing a shaped rubber profile.

In the context of the present invention, the expression "sulfur-crosslinkable rubber mixture" especially encompasses a ready-to-use sulfur-crosslinkable rubber mixture.

In the context of the present invention, the expression "contactless adjustment of the temperature of a mixture" means that the mixture is heated via thermal radiation, for example in an oven. Another mode of heating via thermal conduction or convection is also possible, but the expression "contactlessly adjusting the temperature" in the context of the present invention includes at least one temperature adjustment operation by means of thermal radiation.

In the context of the present invention, the expression "a unit B connected downstream of unit A" means that the rubber mixture, for production of the rubber profile, passes first through unit A and then unit B. It is particularly preferable when the extrusion unit, in an apparatus of the invention described hereinafter, directly adjoins the temperature adjustment unit in order that the temperature of the rubber mixture does not fall between the temperature adjustment unit and the extrusion unit, especially not by 5° C.

In the context of the present invention, the expression "adjusting the temperature of a rubber mixture" means any action that results in a significant variance in the natural cooling characteristics of a rubber mixture at a given ambient temperature of 25° C., including both heating, for example by means of heating elements, and cooling of the rubber mixture that has been slowed compared to the natural cooling characteristics, but preferably heating. Natural cooling characteristics of a rubber mixture here are especially the matching of the temperature of a heated rubber mixture to the ambient temperature on account of thermodynamic equilibrium. The expression "adjusting the temperature of a rubber mixture" in the context of the present invention thus encompasses not just the heating of a rubber mixture having a temperature below ambient temperature up to ambient temperature.

In the context of the present invention, the expression "producing a sulfur-crosslinkable rubber mixture" preferably especially comprises the producing of a sulfur-crosslinkable ready-to-use rubber mixture.

Preference is given to a process of the invention as described above or as described above as preferred, wherein the process additionally comprises the following step E) and wherein step E) is preferably performed by means of a closed-loop control unit described below for an apparatus of the invention:

E) controlling the temperature of a rubber mixture in the temperature adjustment unit as a function of
the drive power for rotating a screw of the extrusion unit
and/or
the pressure of the rubber mixture in the extrusion unit
and/or
the variations in pressure of the rubber mixture in the extrusion unit
and/or
the variations in weight per meter of the extruded rubber mixture downstream of the extrusion unit.

One advantage of the above-described aspect of the present invention is that this closed-loop control offers a constantly high quality of the extruded rubber profile downstream of the extrusion unit. This is described in greater detail hereinafter.

The measurement of temperature in step C) ensures that the rubber mixture has been heated sufficiently for the predetermined temperature of at least 40° C. to be attained. The measurement of temperature is therefore preferably performed in the temperature adjustment unit.

On account of the closed-loop control as a function of the parameters described above, all that is needed is to ascertain the surface area of the rubber mixture, which constitutes a considerable process technology advantage in the automation and attainment of the desired variations in weight and shape. The use of the measurement of temperature as controlled variable for the lowering of the variations in weight per meter of the extruded rubber mixture downstream of the extrusion unit is thus a great achievement of the present invention.

Preference is given to a process of the invention as described above or as described above as preferred, wherein the process additionally comprises the following step E) and wherein step E) is preferably performed by means of a closed-loop control unit described below for an apparatus of the invention:

E) controlling the temperature of a rubber mixture in the temperature adjustment unit as a function of
the drive power for rotating a screw of the extrusion unit
or
the pressure of the rubber mixture in the extrusion unit
or
the variations in pressure of the rubber mixture in the extrusion unit
or
the variations in weight per meter of the extruded rubber mixture downstream of the extrusion unit.

One advantage of the above-described aspect of the present invention is that the closed-loop control unit, during the extrusion, can constantly and fully automatically ensure that the rubber mixture or its surface, on entry into the extrusion unit, is at 40° C. or a desired higher temperature value, in order for there to be a reduction in said drive output, the pressure of the rubber mixture in the extrusion unit, the variations in pressure of the rubber mixture in the extrusion unit, or the variations in weight per meter of the extruded rubber mixture. A corresponding closed-loop control unit has the components of a standard closed-loop control unit as known in the prior art, and hence enables complete automation of a process of the invention with improved quality of the weight and geometry of the resultant rubber profile as described above.

The rubber mixture, the temperature of which is measured in step C) and is controlled as described above and hereinafter, in the context of the present invention, is preferably the rubber mixture in the temperature adjustment unit or the rubber mixture immediately upstream of the feeding into the extrusion unit or the feed unit described below.

Preference is given to a process of the invention as described above or as described above as preferred, wherein the process additionally comprises the following step E) and wherein step E) is preferably performed by means of a closed-loop control unit described below for an apparatus of the invention:

E) controlling the temperature of a rubber mixture in the temperature adjustment unit as a function of
the pressure of the rubber mixture in the extrusion unit
and
the variations in pressure of the rubber mixture in the extrusion unit.

Preference is given to a process of the invention as described above or as described above as preferred, wherein the process additionally comprises the following step E) and wherein step E) is preferably performed by means of a closed-loop control unit described below for an apparatus of the invention:

E) controlling the temperature of a rubber mixture in the temperature adjustment unit as a function of
the drive power for rotating a screw of the extrusion unit
and
the pressure of the rubber mixture in the extrusion unit
and
the variations in pressure of the rubber mixture in the extrusion unit.

One advantage of the above-described aspect of the present invention is that the above-described control by the closed-loop control unit encompasses all closed-loop control parameters for avoidance of an excessively high temperature in the extrusion unit. Local increases in temperature in the extrusion unit of more than 120° C. are thus avoided on account of the temperature adjustment in step B). This considerably reduces the variances in the weight per meter or the shape of the rubber profile.

Preference is given to a process of the invention as described above or as described above as preferred, wherein the process additionally comprises the following step E) and wherein step E) is preferably performed by means of a closed-loop control unit described below for an apparatus of the invention:

E) controlling the temperature of a rubber mixture in the temperature adjustment unit as a function of
the drive power for rotating a screw of the extrusion unit
and
the variations in weight per meter of the extruded rubber mixture downstream of the extrusion unit.

One advantage of the above-described aspect of the present invention is that the above-described control by the closed-loop control unit encompasses all closed-loop control parameters for reduction in the variances from the target value of the weight per meter of the extruded rubber profile.

Preference is given to a process of the invention as described above or as described above as preferred, wherein the process additionally comprises the following step E) and wherein step E) is preferably performed by means of a closed-loop control unit described below for an apparatus of the invention:

E) controlling the temperature of a rubber mixture in the temperature adjustment unit as a function of
the drive power for rotating a screw of the extrusion unit
and
the pressure of the rubber mixture in the extrusion unit
and
the variations in pressure of the rubber mixture in the extrusion unit
and
the variations in weight per meter of the extruded rubber mixture downstream of the extrusion unit.

Particular preference is given to a process of the invention as described above or as described above as preferred, wherein the sulfur-crosslinkable rubber mixture, the temperature of which has been adjusted in step B), in the temperature adjustment unit, at least partly has a temperature in the range from 40° C. to 150° C., preferably in the range from 50° C. to 110° C.

One advantage of the above-described aspect of the present invention is that, especially at these temperatures, particularly small variances occur from the target value of the weight per meter as described above.

Particular preference is also given to a process of the invention as described above or as described above as preferred or especially as described above as particularly preferred, wherein the sulfur-crosslinkable rubber mixture fed in in step D), in the extrusion unit, at least partly has a temperature in the range from 20° C. to 150° C., preferably in the range from 30° C. to 110° C., more preferably in the range from 40° C. to 80° C., and/or has a pressure in the range from 5 to 150 bar, preferably in the range from 70 to 110 bar, more preferably in the range from 90 to 105 bar, most preferably in the range from 93 to 100 bar.

One advantage of the above-described aspect of the present invention is that, especially at these temperatures and pressures, particularly small variances occur from the target value of the weight per meter as described above.

Preference is given to a process of the invention as described above or as described above as preferred, wherein the sulfur-crosslinkable rubber mixture on measurement in step C) has a Mooney viscosity [ML1+4 at 100° C.] in the range from 40 MU to 150 MU.

One advantage of the above-described aspect of the present invention is that, by virtue of the temperature adjustment unit, it is also possible to extrude rubber mixtures as described above to give a rubber profile having high quality and dimensional stability as described above.

Preference is given to a process of the invention as described above or as described above as preferred, wherein the temperature adjustment unit and/or the extrusion unit comprises measurement sensors, wherein one or more of the measurement sensors ascertains the temperature of the rubber mixture in the temperature adjustment unit in step C) and/or, in a further process step, ascertains the temperature and pressure of the rubber mixture in the extrusion unit.

One advantage of the above-described aspect of the present invention is described hereinafter in relation to the apparatus of the invention.

Preference is given to a process of the invention as described above or as described above as preferred, wherein the process comprises the following step A0) which is performed prior to step A):

A0) producing a sulfur-crosslinkable rubber mixture by means of a mixer for production of sulfur-crosslinkable rubber mixtures, connected upstream of the temperature adjustment unit.

One advantage of the above-described aspect of the present invention is described hereinafter in relation to the apparatus of the invention.

Preference is given to a process of the invention as described above or as described above as preferred, wherein step D) of the process is as follows:

D) feeding the sulfur-crosslinkable rubber mixture measured in step C) into an extrusion unit at a temperature of 35° C. or more by means of a feed unit and extruding the rubber mixture fed into the extrusion unit in the extrusion unit, wherein the feed unit comprises a roll system or an extruder, wherein the feed unit is preferably connected downstream of the temperature adjustment unit.

One advantage of the above-described aspect of the present invention is described hereinafter in relation to the apparatus of the invention.

The above-described advantageous aspects of a process of the invention for producing an extruded sulfur-crosslinkable rubber mixture are also applicable to all aspects of an apparatus described hereinafter for performance of a process as described above or as described above as preferred or as described below as an aspect, and the advantageous aspects discussed below of inventive apparatuses for performance of a process as described above or as described above as preferred or as described below as an aspect are correspondingly applicable to all aspects of a process of the invention.

The invention also relates to an apparatus for performance of a process as described above or as described above as preferred or as described below as an aspect, comprising
at least one temperature adjustment unit for contactless adjustment of the temperature of a sulfur-crosslinkable rubber mixture
and
at least one extrusion unit connected downstream of the temperature adjustment unit,
characterized in that
the temperature adjustment unit is designed to heat a sulfur-crosslinkable rubber mixture present in the temperature adjustment unit to at least 40° C.

Preference is given to an apparatus of the invention as described above or as described above as preferred, wherein the apparatus comprises measurement sensors, wherein one or more of the measurement sensors are designed and arranged so as to ascertain the temperature of the rubber mixture in the temperature adjustment unit and/or the temperature and/or pressure of the rubber mixture in the extrusion unit.

Preference is also given to an apparatus of the invention as described above or as described above as preferred, wherein the apparatus comprises measurement sensors, wherein one or more of the measurement sensors are designed and arranged so as to ascertain the temperature of the rubber mixture in the temperature adjustment unit and preferably additionally to ascertain the temperature or pressure of the rubber mixture in the extrusion unit.

One advantage of the above-described aspect of the present invention is that the temperature of the rubber mixture in the temperature adjustment unit can thus be monitored constantly by personnel in order to ensure the above-described advantages of the resulting rubber profile of the present invention.

Preference is given to an apparatus of the invention as described above or as described above as preferred, wherein the apparatus comprises measurement sensors, wherein one or more of the measurement sensors are designed and arranged so as to ascertain the temperature of the rubber mixture in the temperature adjustment unit and the temperature and pressure of the rubber mixture in the extrusion unit.

One advantage of the above-described aspect of the present invention is that the monitoring of the temperature or pressure of the rubber mixture in the extrusion unit can additionally ensure that the rubber mixture in the extrusion unit does not experience too high a temperature and hence is not already scorched or prevulcanized. Scorched or prevulcanized rubber mixture likewise has to be discarded, and hence reduces the efficiency of an apparatus of the invention.

Preference is given to an apparatus of the invention as described above or as described above as preferred, wherein the apparatus additionally comprises a closed-loop control unit designed to control the temperature of a rubber mixture in the temperature adjustment unit as a function of
    the drive power for rotating a screw of the extrusion unit
    or
    the pressure of the rubber mixture in the extrusion unit
    or
    the variations in pressure of the rubber mixture in the extrusion unit
    or
    the variations in weight per meter of the extruded rubber mixture downstream of the extrusion unit.

One advantage of the above-described aspect of the present invention is that the closed-loop control unit, during the extrusion, can constantly and fully automatically ensure that the rubber mixture, on entry into the extrusion unit, is at 40° C. or a desired higher temperature value, in order for there to be a reduction in said drive output, the pressure of the rubber mixture in the extrusion unit, the variations in pressure of the rubber mixture in the extrusion unit, or the variations in weight per meter of the extruded rubber mixture. A corresponding closed-loop control unit has the components of a standard closed-loop control unit as known in the prior art, and hence enables complete automation with improved quality of the weight and geometry of the resultant rubber profile as described above.

Preference is given to an apparatus of the invention as described above or as described above as preferred, wherein the temperature adjustment unit and/or the extrusion unit comprises measurement sensors, wherein one or more of the measurement sensors can ascertain the temperature of the rubber mixture in the temperature adjustment unit in step C) and/or, in a further process step, can ascertain the temperature and pressure of the rubber mixture in the extrusion unit.

One advantage of the above-described aspect of the present invention is that the above-described closed-loop control parameters of the above-described closed-loop control unit can be detected.

Preference is given to an apparatus of the invention as described above or as described above as preferred, wherein the process comprises the following step A0) which is performed prior to step A):
    A0) producing a sulfur-crosslinkable rubber mixture by means of a mixer for production of sulfur-crosslinkable rubber mixtures, connected upstream of the temperature adjustment unit.

One advantage of the above-described aspect of the present invention in relation to the mixer is described hereinafter.

Preference is given to an apparatus of the invention as described above or as described above as preferred, wherein step D) of the process is as follows:
    D) feeding the sulfur-crosslinkable rubber mixture measured in step C) into an extrusion unit at a temperature of 35° C. or more by means of a feed unit and extruding the rubber mixture fed into the extrusion unit in the extrusion unit, wherein the feed unit comprises a roll system or an extruder, wherein the feed unit is preferably connected downstream of the temperature adjustment unit.

One advantage of the above-described aspect of the present invention in relation to the feed unit is described hereinafter.

Preference is also given to an apparatus of the invention as described above or as described above as preferred, wherein the apparatus additionally comprises a closed-loop control unit designed to control the temperature of a rubber mixture in the temperature adjustment unit as a function of
    the pressure of the rubber mixture in the extrusion unit
    and
    the variations in pressure of the rubber mixture in the extrusion unit.

Preference is also given to an apparatus of the invention as described above or as described above as preferred, wherein the apparatus additionally comprises a closed-loop control unit designed to control the temperature of a rubber mixture in the temperature adjustment unit as a function of
    the drive power for rotating a screw of the extrusion unit
    and
    the pressure of the rubber mixture in the extrusion unit
    and
    the variations in pressure of the rubber mixture in the extrusion unit.

One advantage of the above-described aspect of the present invention is that the above-described control by the closed-loop control unit encompasses all closed-loop control parameters for avoidance of an excessively high temperature in the extrusion unit.

Preference is also given to an apparatus of the invention as described above or as described above as preferred, wherein the apparatus additionally comprises a closed-loop control unit designed to control the temperature of a rubber mixture in the temperature adjustment unit as a function of
    the drive power for rotating a screw of the extrusion unit
    and
    the variations in weight per meter of the extruded rubber mixture downstream of the extrusion unit.

One advantage of the above-described aspect of the present invention is that the above-described control by the closed-loop control unit encompasses all closed-loop control parameters for reduction in the variances from the target value of the weight per meter of the extruded rubber profile.

Preference is also given to an apparatus of the invention as described above or as described above as preferred, wherein the apparatus additionally comprises a closed-loop control unit designed to control the temperature of a rubber mixture in the temperature adjustment unit as a function of
    the drive power for rotating a screw of the extrusion unit
    and
    the pressure of the rubber mixture in the extrusion unit
    and
    the variations in pressure of the rubber mixture in the extrusion unit
    and
    the variations in weight per meter of the extruded rubber mixture downstream of the extrusion unit.

Preference is given to an apparatus of the invention as described above or as described above as preferred, wherein the apparatus includes a mixer for producing sulfur-crosslinkable rubber mixtures, connected upstream of the temperature adjustment unit, wherein there is a storage unit arranged spatially between the mixer and the temperature adjustment unit, wherein the storage unit is set up to cool down a rubber mixture produced in the mixer to below 40° C. or even below 30° C. Such a storage unit could, for example, be a one-euro pallet.

One advantage of the above-described aspect of the present invention is that previously stored rubber mixtures in particular that are at a temperature below 40° C. or even below 30° C. have particularly high variances from the target value of the weight per meter after an extrusion known in the art. The use of an apparatus of the invention in the case of such rubber mixtures is therefore particularly advantageous.

Preference is given to an apparatus of the invention as described above or as described above as preferred, wherein, the apparatus, rather than the at least one temperature adjustment unit for contactless adjustment of the temperature of a sulfur-crosslinkable rubber mixture, has a temperature adjustment unit without mixing tools, for example
   gears for extruding rubber mixtures,
   roll systems
   or
   extruder screws,
wherein the temperature adjustment unit without mixing tools is preferably present in addition to an above-described or below-described temperature adjustment unit for contactless adjustment of the temperature of a sulfur-crosslinkable rubber mixture.

One advantage of the above-described aspect of the present invention is that faster and less expensive heating of the rubber mixture prior to extrusion in a said temperature adjustment unit of an apparatus of the invention is brought about compared to apparatuses of the invention in which an above-described temperature adjustment unit comprises said mixing tools. More particularly, the above-described temperature adjustment units without said mixing tools have the advantage that they do not shorten the chains of the rubber molecules, which improves the chemical and physical properties of the ultimately resulting tires to a greater-than-proportional degree. Without wishing to be bound to any scientific theory, the technical effect here is attributable to the new combination of contactless temperature adjustment and subsequent closed-loop control with the measurement of the temperature of the rubber mixture, the temperature of which has been adjusted, or of its surface.

Preference is given to an apparatus of the invention as described above or as described above as preferred, which is set up for extrusion of rubber mixtures intended for production of tires.

Preference is given to an apparatus of the invention as described above or as described above as preferred, wherein the apparatus, rather than the at least one temperature adjustment unit for contactless adjustment of the temperature of a sulfur-crosslinkable rubber mixture, comprises at least one oven or at least one heating unit for heating by means of microwaves, and is preferably designed to heat a sulfur-crosslinkable rubber mixture present in the feed unit to at least 70° C. The temperature adjustment unit may also exclusively or additionally comprise an IR source.

Preference is given to an apparatus of the invention as described above or as described above as preferred, wherein the apparatus, in addition to the temperature adjustment unit for contactless temperature adjustment, comprises at least one oven or at least one heating unit for heating by means of microwaves, and is preferably designed to heat a sulfur-crosslinkable rubber mixture present in the feed unit to at least 70° C.

One advantage of the above-described aspect of the present invention is that the variances from the envisaged target value of the weight per meter are reduced to one third by the heating to at least 50° C. upstream of the extrusion unit of an apparatus of the invention. Such a reduction to one third of the variances from the target value of the weight per meter results in an increase in productivity of at least 7% compared to noninventive apparatuses and hence in a considerable reduction in the burden on the environment. At the same time, not only are variances from the target value of the weight per meter reduced, but also the pressures and variations in pressure of the rubber mixture that occur in the extrusion unit or the drive power of the extruder screw of the extrusion unit used for extrusion of the rubber mixture in the extrusion unit in an apparatus of the invention as described above or as described above as preferred.

Preference is given to an apparatus of the invention as described above or as described above as preferred, wherein the apparatus additionally comprises at least one feed unit for feeding rubber mixtures into the downstream extrusion unit, wherein the feed unit comprises a roll system or an extruder having one or two extruder screws or another apparatus known to the person skilled in the art for extruding a rubber mixture, wherein the feed unit is preferably connected downstream of the temperature adjustment unit.

One advantage of the above-described aspect of the present invention is that the above-described use of an additional feed unit leads to a further reduction in the variances from the target value of the weight per meter of the extruded rubber profile.

A particularly high degree of preference is given to an apparatus of the invention as described above, comprising:
   at least one temperature adjustment unit for contactless adjustment of the temperature of a sulfur-crosslinkable rubber mixture
   and
   at least one extrusion unit connected downstream of the temperature adjustment unit,
characterized in that
   the apparatus additionally comprises multiple measurement sensors and
   the temperature adjustment unit is designed to heat a sulfur-crosslinkable rubber mixture present in the temperature adjustment unit to at least 50° C.,
wherein
   the multiple measurement sensors are designed and arranged so as to ascertain the temperature and pressure of the rubber mixture in the temperature adjustment unit and the temperature and pressure of the rubber mixture in the extrusion unit,
   the apparatus additionally comprises a closed-loop control unit designed to control the temperature of a rubber mixture in the temperature adjustment unit as a function of the variations in weight per meter of the extruded rubber mixture downstream of the extrusion unit,
   the apparatus has a mixer for producing sulfur-crosslinkable rubber mixtures, connected upstream of the temperature adjustment unit,
   the temperature adjustment unit does not have any mixing tools such as gears for extruding rubber mixtures, roll systems or extruder screws, the temperature adjustment unit comprises at least one IR source or at least one oven or at least one heating unit for heating by means of microwaves, and the feed unit comprises a roll system or an extruder, the feed unit being connected downstream of the temperature adjustment unit.

The above-described advantageous aspects of an apparatus of the invention for performance of a process as described above or as described above as preferred or as described below as an aspect and of a process of the invention for producing an extruded sulfur-crosslinkable rubber mixture are also applicable to all aspects of a use described below, and the advantageous aspects discussed below of uses of the invention are correspondingly applicable to all aspects of an apparatus of the invention for performance of a process as described above or as described above as preferred or as described below as an aspect and of a process of the invention for producing an extruded sulfur-crosslinkable rubber mixture.

The invention also relates to use of an apparatus as described above or as described above as preferred for lowering the variations in the weight per meter of extruded sulfur-crosslinkable rubber mixtures.

The invention is described hereinafter in further embodiments in the form of aspects:

1. An apparatus for extrusion of sulfur-crosslinkable rubber mixtures, comprising
   at least one temperature adjustment unit for contactless adjustment of the temperature of a sulfur-crosslinkable rubber mixture
   and
   at least one extrusion unit connected downstream of the temperature adjustment unit,
   characterized in that
   the temperature adjustment unit is designed to heat a sulfur-crosslinkable rubber mixture present in the temperature adjustment unit to at least 40° C.
2. The apparatus according to aspect 1, wherein the apparatus comprises measurement sensors, wherein one or more of the measurement sensors are designed and arranged so as to ascertain the temperature of the rubber mixture in the temperature adjustment unit and the temperature and pressure of the rubber mixture in the extrusion unit.
3. The apparatus according to either of the preceding aspects, wherein the apparatus additionally comprises a closed-loop control unit designed to control the temperature of a rubber mixture in the temperature adjustment unit as a function of
   the drive power for rotating a screw of the extrusion unit
   and/or
   the pressure of the rubber mixture in the extrusion unit
   and/or
   the variations in pressure of the rubber mixture in the extrusion unit
   and/or
   the variations in weight per meter of the extruded rubber mixture downstream of the extrusion unit.
4. The apparatus according to any of the preceding aspects, wherein the apparatus has a mixer for producing sulfur-crosslinkable rubber mixtures, connected upstream of the temperature adjustment unit.
5. The apparatus according to any of the preceding aspects, wherein the apparatus additionally comprises at least one feed unit for feeding rubber mixtures into the downstream extrusion unit, wherein the feed unit comprises a roll system or an extruder, wherein the feed unit is preferably connected downstream of the temperature adjustment unit.
6. The apparatus according to any of the preceding aspects, wherein, the apparatus, rather than the at least one temperature adjustment unit for contactless temperature adjustment of a sulfur-crosslinkable rubber mixture,
   has a temperature adjustment unit without mixing tools such as gears for extruding rubber mixtures, roll systems or extruder screws,
   and/or
   the apparatus comprises at least one oven or at least one heating unit for heating by means of microwaves and is preferably designed to heat a sulfur-crosslinkable rubber mixture present in the feed unit to at least 70° C.
7. The use of an apparatus as defined in any of the preceding aspects for reducing the variations in weight per meter of extruded sulfur-crosslinkable rubber mixtures.
8. A process for producing an extruded, sulfur-crosslinkable rubber mixture, comprising the following process steps:
   A) producing a sulfur-crosslinkable rubber mixture by means of a mixer or providing a sulfur-crosslinkable rubber mixture, where the temperature of the sulfur-crosslinkable rubber mixture is less than 35° C.,
   B) adjusting the temperature of the sulfur-crosslinkable rubber mixture produced or provided in step A) to at least 40° C. in a temperature adjustment unit,
   C) measuring the temperature of the rubber mixture in the temperature adjustment unit
   and
   D) feeding the sulfur-crosslinkable rubber mixture that has been measured in step C) into an extrusion unit at a temperature of 35° C. or more and extruding the fed rubber mixture in the extrusion unit.
9. The process according to any of aspects 8 to 10, wherein the process additionally comprises the following step E):
   E) controlling the temperature of a rubber mixture in the temperature adjustment unit as a function of
   the drive power for rotating a screw of the extrusion unit
   and/or
   the pressure of the rubber mixture in the extrusion unit
   and/or
   the variations in pressure of the rubber mixture in the extrusion unit
   and/or
   the variations in weight per meter of the extruded rubber mixture downstream of the extrusion unit.
10. The process according to any of aspects 8 to 10, wherein the sulfur-crosslinkable rubber mixture, the temperature of which has been adjusted in step B), in the temperature adjustment unit, at least partly has a temperature in the range from 40° C. to 150° C., preferably in the range from 50° C. to 110° C.
11. The process according to any of aspects 8 to 10, wherein the sulfur-crosslinkable rubber mixture fed in in step D), in the extrusion unit, at least partly has a temperature in the range from 20° C. to 150° C., preferably in the range from 40° C. to 80° C., and/or has a pressure in the range from 5 to 150 bar, preferably in the range from 70 to 110 bar, more preferably in the range from 90 to 105 bar, most preferably in the range from 93 to 100 bar.

The invention claimed is:

1. A process for producing an extruded, sulfur-crosslinkable rubber mixture, the process comprising the following process steps:
   A) producing a sulfur-crosslinkable rubber mixture by using a mixer, or providing a sulfur-crosslinkable rubber mixture, wherein temperature of the sulfur-crosslinkable rubber mixture is less than 35° C.;
   B) contactlessly adjusting the temperature of the sulfur-crosslinkable rubber mixture produced or provided in step A) to at least 40° C. in a temperature adjustment unit;
   C) measuring the temperature of the sulfur-crosslinkable rubber mixture, the temperature of which has been adjusted in step B);
   D) feeding the sulfur-crosslinkable rubber mixture, the temperature of which has been adjusted in step B) and measured in step C), into an extrusion unit at a temperature of 35° C. or more and extruding the fed sulfur-crosslinkable rubber mixture with the extrusion unit; and,
   E) controlling the temperature of the sulfur-crosslinkable rubber mixture by using the temperature adjustment unit based on closed-loop control as a function of at least one of the following parameters:
      drive power for rotating a screw of the extrusion unit;
      pressure of the sulfur-crosslinkable rubber mixture in the extrusion unit;
      variations in pressure of the sulfur-crosslinkable rubber mixture in the extrusion unit; or
      variations in weight per meter of the extruded sulfur-crosslinkable rubber mixture downstream of the extrusion unit,
   wherein the contactlessly adjusting the temperature of the sulfur-crosslinkable rubber mixture in step B) includes heating the sulfur-crosslinkable rubber mixture produced or provided in step A) with thermal radiation from at least one heating unit, wherein the heating is to within a temperature range from (a) 40° C. or more to (b) less than a pre-vulcanization temperature of the sulfur-crosslinkable rubber mixture;
   wherein the temperature adjustment unit and/or the extrusion unit comprises at least one temperature sensor, wherein one or more of the at least one temperature sensor ascertains the temperature of the rubber mixture in step C);
   wherein the at least one parameter from step E) is ascertained during the extruding by using one or more measurement sensors;
   wherein the controlling the temperature of the sulfur-crosslinkable rubber mixture by using the temperature adjustment unit based on closed-loop control in step E) includes cooling or heating the sulfur-crosslinkable rubber mixture in the temperature adjustment unit based upon the at least one parameter ascertained from the one or more measurement sensors; and
   wherein, when heating is performed in step E), the heating uses contactless heating via thermal radiation from the at least one heating unit to control the temperature to within a temperature range from (a) 40° C. or more to (b) less than the pre-vulcanization temperature of the sulfur-crosslinkable rubber mixture.

2. The process as claimed in claim 1, wherein the process in step A) includes
   producing the sulfur-crosslinkable rubber mixture by using a mixer connected upstream of the temperature adjustment unit.

3. The process as claimed in claim 1, wherein the feeding in step D) is performed using a feed unit that feeds the rubber mixture into the extrusion unit, wherein the feed unit comprises a roll system or an extruder, wherein the feed unit is connected between the temperature adjustment unit and the extrusion unit.

4. The process as claimed in claim 1, wherein the sulfur-crosslinkable rubber mixture, the temperature of which has been adjusted in step B), in the temperature adjustment unit, is contactlessly heated with infrared and/or microwaves to at least partly have a temperature in the range from 40° C. to 150° C.

5. The process as claimed in claim 1, wherein the sulfur-crosslinkable rubber mixture fed in in step D), in the extrusion unit, at least partly has a temperature in the range from 20°° C. to 150° C.

6. The process as claimed in claim 1, wherein the sulfur-crosslinkable rubber mixture fed in in step D), in the extrusion unit, has a pressure in the range from 5 to 150 bar.

7. The process according to claim 1, wherein the controlling the temperature of the sulfur-crosslinkable rubber mixture by using the temperature adjustment unit based on closed-loop control in step E) is a function of the drive power for rotating a screw of the extrusion unit.

8. The process according to claim 1, wherein the controlling the temperature of the sulfur-crosslinkable rubber mixture by using the temperature adjustment unit based on closed-loop control in step E) is a function of the pressure of the sulfur-crosslinkable rubber mixture in the extrusion unit.

9. The process according to claim 1, wherein the controlling the temperature of the sulfur-crosslinkable rubber mixture by using the temperature adjustment unit based on closed-loop control in step E) is a function of the variations in pressure of the sulfur-crosslinkable rubber mixture in the extrusion unit.

10. The process according to claim 1, wherein the controlling the temperature of the sulfur-crosslinkable rubber mixture by using the temperature adjustment unit based on closed-loop control in step E) is a function of the variations in weight per meter of the extruded sulfur-crosslinkable rubber mixture downstream of the extrusion unit.

11. The process according to claim 1, wherein the controlling the temperature of the sulfur-crosslinkable rubber mixture by using the temperature adjustment unit based on closed-loop control in step E) is a function of
    the drive power for rotating a screw of the extrusion unit; and,
    the pressure of the sulfur-crosslinkable rubber mixture in the extrusion unit.

12. The process as claimed in claim 1, wherein the sulfur-crosslinkable rubber mixture, the temperature of which has been adjusted in step B), in the temperature adjustment unit, is contactlessly heated with infrared to at least partly have a temperature in the range from 50°° C. to 110° C., the temperature adjustment unit being devoid of mixing tools.

13. The process as claimed in claim 1, wherein the sulfur-crosslinkable rubber mixture fed in in step D), in the extrusion unit, at least partly has a temperature in the range from 40°° C. to 80° C.

14. The process as claimed in claim 1, wherein the sulfur-crosslinkable rubber mixture fed in in step D), in the extrusion unit, has a pressure in the range from 70 to 110 bar.

15. An apparatus comprising:
- at least one temperature adjustment unit for contactless adjustment of the temperature of a sulfur-crosslinkable rubber mixture; and,
- at least one extrusion unit connected downstream of the temperature adjustment unit;
- wherein the apparatus is configured to perform at least the process steps of:
  A) producing the sulfur-crosslinkable rubber mixture by using a mixer, or providing a sulfur-crosslinkable rubber mixture, wherein temperature of the sulfur-crosslinkable rubber mixture is less than 35° C.;
  B) contactlessly adjusting the temperature of the sulfur-crosslinkable rubber mixture produced or provided in step A) to at least 40° C. with the temperature adjustment unit;
  C) measuring the temperature of the sulfur-crosslinkable rubber mixture, the temperature of which has been adjusted in step B);
  D) feeding the sulfur-crosslinkable rubber mixture, the temperature of which has been adjusted in step B) and measured in step C), into the extrusion unit at a temperature of 35° C. or more and extruding the fed sulfur-crosslinkable rubber mixture with the extrusion unit; and,
  E) controlling the temperature of the sulfur-crosslinkable rubber mixture by using the temperature adjustment unit based on closed-loop control as a function of at least one of the following parameters:
  - drive power for rotating a screw of the extrusion unit;
  - pressure of the sulfur-crosslinkable rubber mixture in the extrusion unit;
  - variations in pressure of the sulfur-crosslinkable rubber mixture in the extrusion unit; or
  - variations in weight per meter of the extruded sulfur-crosslinkable rubber mixture downstream of the extrusion unit,
- wherein the contactlessly adjusting the temperature of the sulfur-crosslinkable rubber mixture in step B) includes heating the sulfur-crosslinkable rubber mixture produced or provided in step A) with thermal radiation from at least one heating unit,
- wherein the heating is to within a temperature range from (a) 40° C. or more to (b) less than a pre-vulcanization temperature of the sulfur-crosslinkable rubber mixture;
- wherein the temperature adjustment unit and/or the extrusion unit comprises at least one temperature sensor, wherein one or more of the at least one temperature sensor ascertains the temperature of the rubber mixture in step C);
- wherein the at least one parameter from step E) is ascertained during the extruding by using one or more measurement sensors;
- wherein the controlling the temperature of the sulfur-crosslinkable rubber mixture by using the temperature adjustment unit based on closed-loop control in step E) includes cooling or heating the sulfur-crosslinkable rubber mixture in the temperature adjustment unit based upon the at least one parameter ascertained from the one or more measurement sensors; and
- wherein, when heating is performed in step E), the heating uses contactless heating via thermal radiation from the at least one heating unit to control the temperature to within a temperature range from (a) 40° C. or more to (b) less than the pre-vulcanization temperature of the sulfur-crosslinkable rubber mixture.

* * * * *